United States Patent
Zhang et al.

(10) Patent No.: US 11,104,435 B2
(45) Date of Patent: Aug. 31, 2021

(54) VERIFICATION METHOD AND APPARATUS

(71) Applicant: SZ DJI TECHNOLOGY CO., LTD., Shenzhen (CN)

(72) Inventors: Guofang Zhang, Shenzhen (CN); Yun Yu, Shenzhen (CN); Renli Shi, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 312 days.

(21) Appl. No.: 16/241,149

(22) Filed: Jan. 7, 2019

(65) Prior Publication Data
US 2019/0135434 A1    May 9, 2019

Related U.S. Application Data

(63) Continuation of application No. PCT/CN2016/088561, filed on Jul. 5, 2016.

(51) Int. Cl.
| | |
|---|---|
| *B64C 39/02* | (2006.01) |
| *G08G 5/00* | (2006.01) |
| *G06F 21/00* | (2013.01) |
| *H04L 29/06* | (2006.01) |
| *G06G 5/00* | (2006.01) |

(Continued)

(52) U.S. Cl.
CPC .............. *B64C 39/024* (2013.01); *G06F 8/65* (2013.01); *G06F 21/00* (2013.01); *G08G 5/006* (2013.01); *G08G 5/0013* (2013.01); *G08G 5/0069* (2013.01); *H04L 63/12* (2013.01); *H04L 63/302* (2013.01); *G07C 5/008* (2013.01); *H04L 63/123* (2013.01)

(58) Field of Classification Search
USPC .......................................................... 701/1
See application file for complete search history.

(56) References Cited

U.S. PATENT DOCUMENTS

| | | | |
|---|---|---|---|
| 2014/0032034 A1* | 1/2014 | Raptopoulos | G05D 1/0088 701/25 |
| 2014/0325644 A1* | 10/2014 | Oberg | G06F 21/51 726/22 |

(Continued)

FOREIGN PATENT DOCUMENTS

| | | |
|---|---|---|
| CN | 102109418 A | 6/2011 |
| CN | 102508439 A | 6/2012 |

(Continued)

OTHER PUBLICATIONS

The World Intellectual Property Organization (WIPO) International Search Report for PCT/CN2016/088561 dated Mar. 1, 2017 5 pages.

*Primary Examiner* — Tyler D Paige
(74) *Attorney, Agent, or Firm* — Anova Law Group, PLLC (57) ABSTRACT

An online verification method includes performing a flight suitability verification on an unmanned aerial vehicle (UAV) system and determining a handling measure of the UAV system according to a verification result. The UAV system includes a UAV and a ground station. The flight suitability verification is performed on at least one of a plurality of verification items. The verification items includes a setting of the UAV system and a setting of data associated with safe operations.

21 Claims, 5 Drawing Sheets

(51) Int. Cl.
*G06F 8/65* (2018.01)
*G07C 5/00* (2006.01)

(56) References Cited

U.S. PATENT DOCUMENTS

| | | | |
|---|---|---|---|
| 2015/0321758 A1* | 11/2015 | Sarna, II | B64C 39/024 |
| | | | 244/63 |
| 2016/0274578 A1* | 9/2016 | Arwine | G06F 21/6209 |
| 2016/0335898 A1* | 11/2016 | Caplan | G08G 5/0052 |
| 2017/0248969 A1* | 8/2017 | Ham | G08G 5/0086 |
| 2017/0285633 A1* | 10/2017 | Poornachandran | G08G 5/0069 |
| 2018/0103036 A1* | 4/2018 | Fox | F42B 12/46 |
| 2018/0276998 A1* | 9/2018 | Yu | G06F 16/29 |

FOREIGN PATENT DOCUMENTS

| | | |
|---|---|---|
| CN | 102789171 A | 11/2012 |
| CN | 103532613 A | 1/2014 |
| CN | 104977912 A | 10/2015 |
| CN | 105047022 A | 11/2015 |

\* cited by examiner

VERIFICATION METHOD AND APPARATUS

CROSS-REFERENCE TO RELATED APPLICATION

This application is a continuation of International Application No. PCT/CN2016/088561, filed on Jul. 5, 2016, the entire contents of which are incorporated herein by reference.

TECHNICAL FIELD

The present disclosure relates to the field of verification and, more particularly, to a verification method and a verification apparatus.

BACKGROUND

Because the number of safety incidents or accidents caused by unmanned aerial vehicles (UAVs) has increased, various countries have issued relevant UAV management policies and requirements to regulate operation activities and design activities of UAVs. However, a plurality of UAV systems cannot satisfy the established safety requirements and cannot guarantee safe operations at an acceptable low-risk status.

SUMMARY

In accordance with the disclosure, there is provided an online verification method including performing a flight suitability verification on an unmanned aerial vehicle (UAV) system and determining a handling measure of the UAV system according to a verification result. The UAV system includes a UAV and a ground station. The flight suitability verification is performed on at least one of a plurality of verification items. The verification items includes a setting of the UAV system and a setting of data associated with safe operations.

Also in accordance with the disclosure, there is provided an online verification system including a processor and a memory storing instructions that, when executed by the processor, cause the processor to perform a flight suitability verification on an unmanned aerial vehicle (UAV) system and determine a handling measure of the UAV system according to a verification result. The UAV system includes a UAV and a ground station. The flight suitability verification is performed on at least one of a plurality of verification items. The verification items includes a setting of the UAV system and a setting of data associated with safe operations.

Also in accordance with the disclosure, there is provided an unmanned aerial vehicle (UAV) system including a UAV, a ground station, and an online verification system arranged at the UAV, the ground station, or a server. The online verification system includes a processor and a memory storing instructions that, when executed by the processor, cause the processor to perform a flight suitability verification on an unmanned aerial vehicle (UAV) system and determine a handling measure of the UAV system according to a verification result. The UAV system includes a UAV and a ground station. The flight suitability verification is performed on at least one of a plurality of verification items. The verification items includes a setting of the UAV system and a setting of data associated with safe operations.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

The present disclosure provides a method and an apparatus for verification to realize connection of an unmanned aerial vehicle (UAV) to network and verification of the UAV, thereby ensuring that the UAV is at an acceptable safety level. Hereinafter, connecting the UAV to a network and verifying the UAV is also referred to as an "online verification" of the UAV system.

In descriptions of embodiments of the present disclosure, a UAV is taken as an example of movable object merely for illustrative purposes. The movable object can include, but is not limited to, a UAV, while another type of movable object may be chosen according to various application scenarios.

Figure 1:
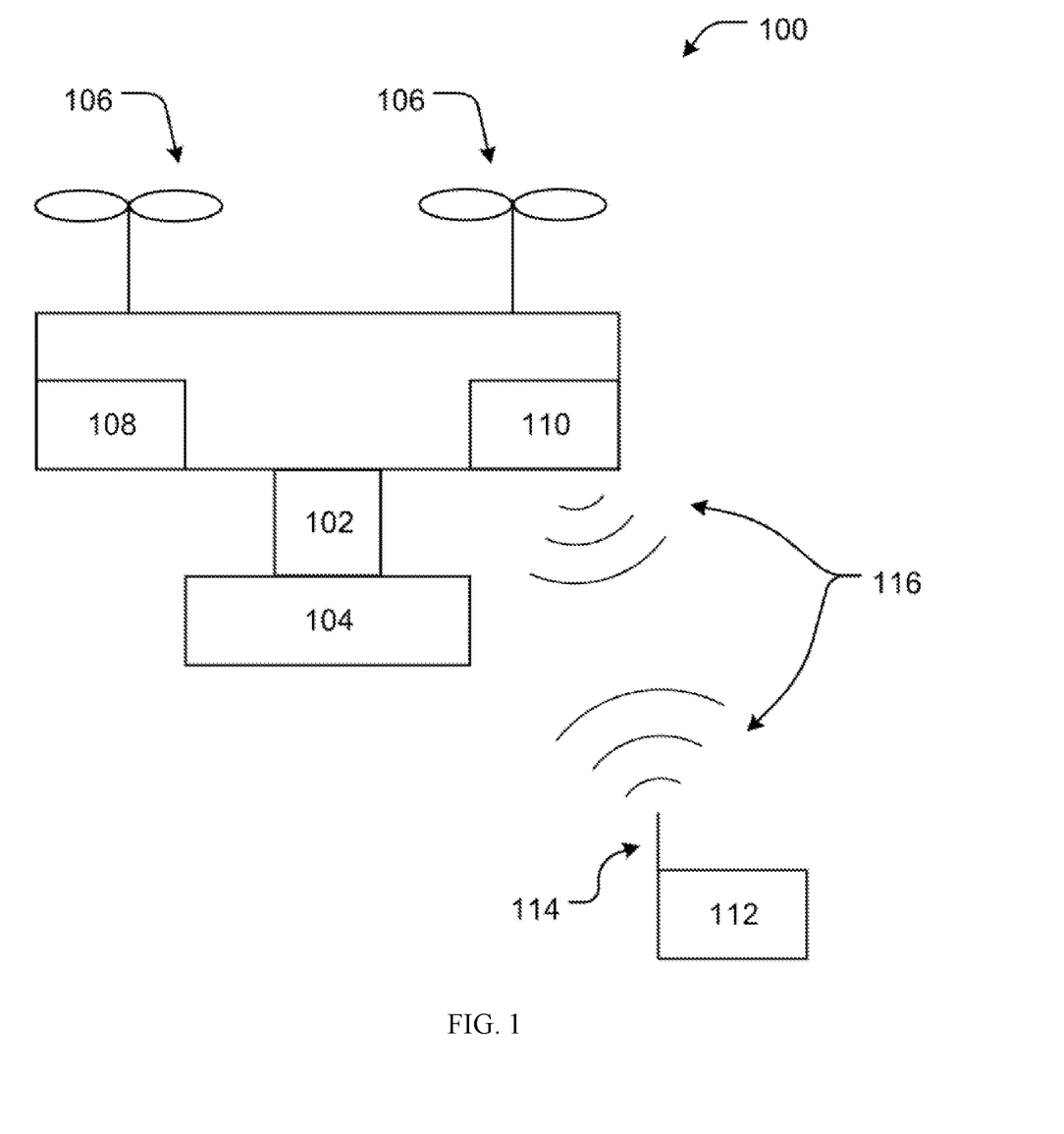
FIG. 1 is a schematic view of an exemplary movable object consistent with various disclosed embodiments of the present disclosure.

FIG. 1 is a schematic view of an exemplary movable object 100 consistent with various disclosed embodiments of the present disclosure. As shown in FIG. 1, the movable object 100 includes a supporting body 102 and a load 104. Although the movable object 100 is described as an aerial vehicle, the movable object is not limited to an aerial vehicle. Various types of movable object may be chosen according to actual application scenarios. The embodiments described herein with respect to an aerial vehicle system can be suitable for any suitable movable object such as a UAV, where appropriate. In some embodiments, the load 104 may be attached directly to the movable object 100 without a need for the supporting body 102. The movable object 100 includes a power mechanism 106, a sensing system 108, and a communication system 110.

In some embodiments, the power mechanism 106 may include one or more rotating bodies, propellers, blades, engines, motors, wheels, bearings, magnets, and/or nozzles. For example, a rotating body of the power mechanism may include a self-tightening rotating body, a rotating body assembly, or another rotating body power component. The movable object can include one or more power mechanisms. In some embodiments, the one or more power mechanisms may be of a same type. In some other embodiments, the one or more power mechanisms may be of different types. The power mechanism 106 may be attached to the movable object by various suitable means, e.g., a support component such as a drive shaft. The power mechanism 106 may be attached to any suitable location of the movable object 100, such as a top end, a lower end, a front end, a back end, a side, or any combination thereof.

In some embodiments, the power mechanism 106 can cause the movable object to take off vertically from a surface or to land vertically on the surface without a need for the movable object 100 to make a horizontal movement, e.g., without a need to slide on a track. In some embodiments, the power mechanism 106 may cause the movable object 100 to hover in a preset position and/or a preset direction in the air. One or more power mechanisms 100 may be independent of other power mechanisms when being controlled. In some embodiments, one or more power mechanisms 100 can be controlled at a same time. For example, the movable object 100 may have a plurality of horizontally oriented rotating bodies to track lifting and/or pushing of a target. The horizontally oriented rotating bodies may be actuated to cause the movable object 100 to take off vertically, descend vertically, and/or hover. In some embodiments, some of the horizontally oriented rotating bodies may rotate clockwise, and some other of the horizontally oriented rotating bodies may rotate counterclockwise. For example, the number of rotating bodies that rotate clockwise may be equal to the number of rotating bodies that rotate counterclockwise. A rotation rate of each horizontally oriented rotating body can be independently changed to achieve lifting and/or pushing operation(s) caused by each rotating body, thereby adjusting a spatial orientation, a velocity and/or an acceleration of the movable object 100, e.g., rotations and translations with respect to three degrees of freedom.

The sensing system 108 may include one or more sensors to sense a spatial orientation, a velocity, and/or an acceleration, e.g., rotations and translations with respect to three degrees of freedom. The one or more sensors may include any above-described sensor, e.g., at least one of a global position system (GPS) sensor, a motion sensor, an inertial sensor, a proximity sensor, or an image sensor. Sensing data provided by the sensing system 108 may be used for tracking the spatial orientation, the velocity, and/or the acceleration of a target, e.g., the movable object 100, by using suitable processing circuits and/or control circuits as described below. In some embodiments, the sensing system 108 may be configured to collect data of an environment of the movable object, such as weather conditions, potential obstacles to be approached, locations of geographic features, locations of man-made structures, and/or the like.

The communication system 110 can communicate with a terminal 112 having a communication system 114 through wireless signals 116. Each of the communications systems 110 and 114 may include one or more transmitters, receivers, and/or transceivers for wireless communications. The communication can include a one-way communication, such that data can be sent in one direction. For example, the one-way communication may include only the movable object 100 transmitting data to the terminal 112, or vice versa. One or more transmitters of the communication system 110 may send data to one or more receivers of the communication system 114, or vice versa. In some embodiments, the communication may include a two-way communication, such that data can be transmitted between the movable object 100 and the terminal 112 in two directions. The bi-directional communication, i.e., the two-way communication, may include one or more transmitters of the communication system 110 sending data to one or more receivers of the communication system 114, and vice versa.

In some embodiments, the terminal 112 may provide control data to at least one of the movable object 100, the supporting body 102, or the load 104, and may receive information from at least one of the movable object 100, the supporting body 102, or the load 104, where the information may include position information and/or motion information of the movable object, the supporting body and/or the load, and/or data sensed by the load such as image data captured by a camera. In some embodiments, the control data of the terminal may include instructions associated with a position, a motion, and/or an actuation, and/or control of the movable object, the supporting body, and/or the load. For example, the control data may cause a change in the position and/or direction of the movable object, e.g., by controlling the power mechanism 106, and/or may cause a movement of the supporting body relative to the movable object, e.g., through control of the supporting body 102. The control data of the terminal can cause the load to control an operation of, for example, a camera or another image capturing device. The operation may include, for example, capturing still or moving images, zooming, turning on or off, switching imaging modes, changing an image resolution, changing a focus, changing a depth of field, changing an exposure time, and/or changing a viewable angle or field of view. In some embodiments, the communication with the movable object, the supporting body, and/or the load may include information sent by one or more sensors, such as the sensor system 108 and/or the load 104. The communication may include sensed information transmitted from one or more different types of sensors, e.g., a GPS sensor, a motion sensor, an inertial sensor, a proximity sensor, and/or an image sensor. The sensed information may be associated with a pose (such as orientation and/or location), a motion, and/or an acceleration of the movable object, the supporting body, and/or the load. Sensed information transmitted from the load may include data captured by the load or a status of the load. The control data transmitted from the terminal 112 may be used for tracking status of, e.g., at least one of the movable object 100, the supporting body 102, or the load 104. In some embodiments, the supporting body 102 and the load 104 each may include a communication circuit configured to communicate with the terminal 112, such that the terminal can individually communicate with or track the movable object 100, the supporting body 102, and/or the load 104.

In some embodiments, the movable object 100 may communicate with a remote device other than the terminal 112, and the terminal 112 may communicate with a remote device other than the movable object 100. For example, the movable object 100 and/or the terminal 112 may communicate with another movable object, a supporting body of another movable object, and/or a load of another movable object. When needed, the above-described additional remote device may include a second terminal or another computing device, such as a computer, a desktop computer, a tablet computer, a smart phone, and/or another mobile device. The additional remote device may transmit data to the movable object 100, receive data from the movable object 100, transmit data to the terminal 112, and/or receive data from the terminal 112. In some embodiments, the remote device may be connected to the Internet or other telecommunication network to upload data received from the movable object 100 and/or the terminal 112 to a web site or a server.

In some embodiments, a movement of the movable object, a movement of the supporting body, and a movement of the load relative to a fixed reference such as an external environment, and/or movement between each other may be controlled by the terminal. The terminal may include a remote control terminal arranged at a position away from the movable object, the supporting body, and/or the load. The terminal can be arranged at or attached to a support platform. In some embodiments, the terminal may be handheld or wearable. For example, the terminal may include a smart phone, a tablet computer, a desktop computer, a computer, glasses, gloves, a helmet, a microphone, or any combination thereof. In some embodiments, the terminal may include a user interface such as a keyboard, a mouse, a joystick, a touch screen, and/or display. Any suitable user input may interact with the terminal, such as manually inputting an instruction, sound control, gesture control, and/or position control, e.g., through a motion, a position, and/or a tilt of the terminal.

The term "upgrade" or similar expressions described in the embodiments of the present disclosure may include firmware upgrades, all or some of database upgrades associated with safe operations, hardware upgrades, and/or model upgrades.

In some embodiments, real-time time information and/or real-time position information may be obtained through an external network. Further, the real-time time information and/or the real-time position information may be compared with time information and/or position information of a latest upgrade or online verification, respectively. That is, the real-time time information may be compared with the time information of the latest upgrade or online verification, and/or the real-time position information may be compared with the position information of the latest upgrade or online verification. In response to a time interval between the real-time time information and the time information of a latest, i.e., last, upgrade or online verification exceeding a preset time interval, the UAV system may take measures such as a flight restriction, a flight prohibition, a warning, and/or a mandatory upgrade. There are various scenarios that the UAV are not suitable for a flight. Some of the scenarios are described below.

In some scenarios, the UAV system is not connected to the Internet for a long time. Accordingly, a suitability verification cannot be performed on a UAV firmware version, a ground control station firmware version, a model, and/or a database associated with safe operations in a UAV or a ground station, such as a flight restriction database, a navigation database, and/or the like.

In some scenarios, the UAV firmware is not upgraded for a long time. Thus, there is no guarantee that the UAV is at a safe operation status.

In some scenarios, a firmware of the ground station is not upgraded for a long time. Thus, it cannot be guaranteed that a suitability of the database (such as a flight restriction database, a navigation database, and/or the like) associated with safe operations in the ground station, corresponding warning and indication functions, a flight restriction function, and/or a safety design are at a safe status.

In some scenarios, mistakes in design or fabrication of the UAV cannot be corrected in time.

In some scenarios, a newly unveiled UAV airworthiness and safety requirements cannot be applied to each UAV system in a timely manner, thus causing the UAV system to be at an unsafe status.

In some scenarios, new designs that increase safety and reliability of aircraft, e.g., UAV, cannot be timely implanted into the UAV system.

The present disclosure provides a method for verifying flight suitability to ensure that a UAV system is at an acceptable level of safety and/or at an airworthiness status to achieve the statuses described below.

It may be ensured that the UAV system can verify flight safety and suitability through a network within a preset time period.

In may be ensured that unsuitable and unsafe model, configurations, firmware versions of UAV and/or ground station, a flight restriction database, and other safety-associated data configurations can be handled in a timely manner, such as mandatory upgrades, recalls, and etc.

It may be ensured that irregularities or unsafe flight behaviors of flight personnel, e.g., flight operator, can be noticed and handled in a timely manner.

It may be ensured that new airworthiness or safety requirements, and safety and reliability designs can be timely implanted into the UAV system.

As the safe operation and airworthiness of the UAV are satisfied, an usability of the UAV may be improved.

Figure 2:
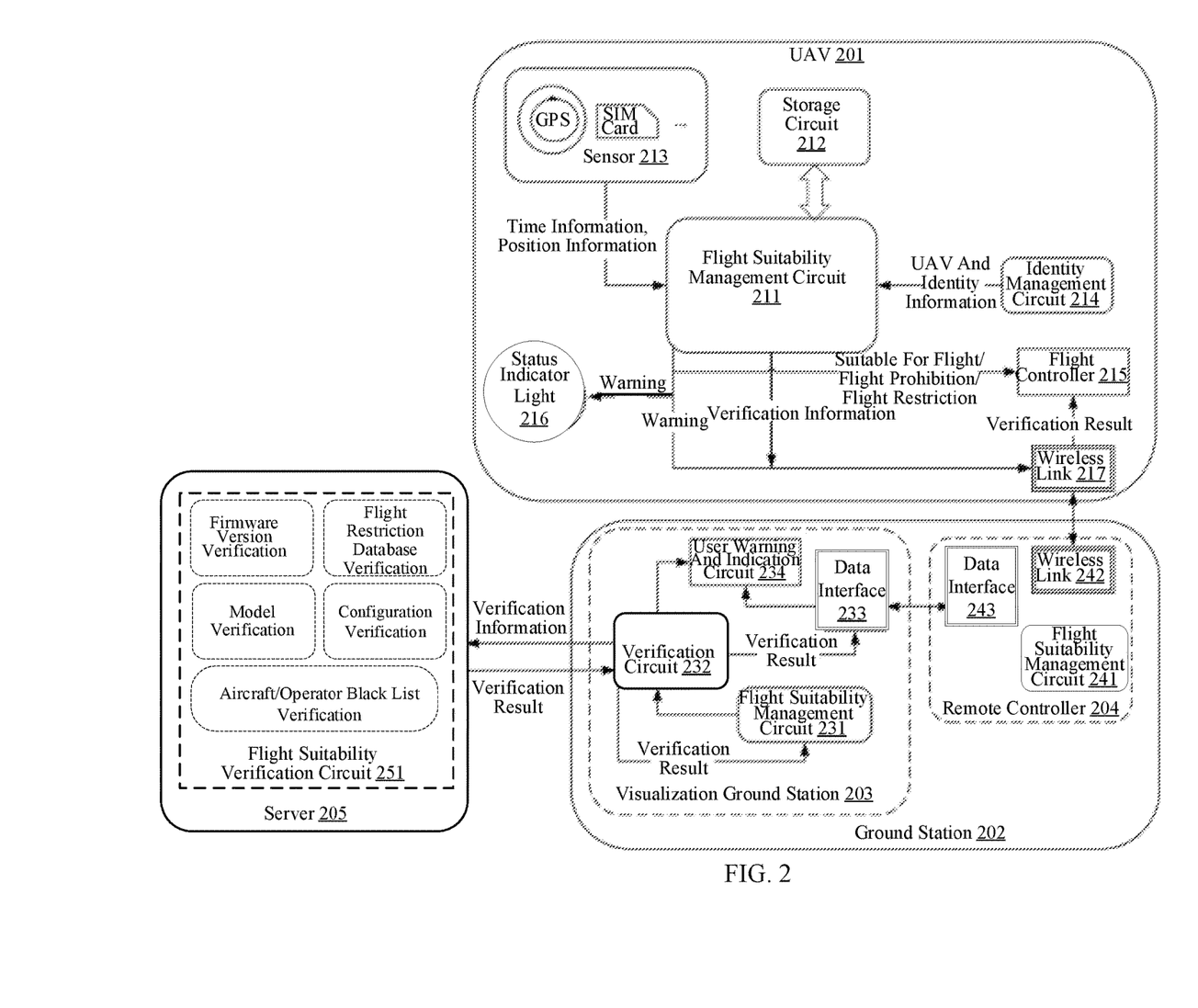
FIG. 2 illustrates a schematic view of verifying flight suitability consistent with various disclosed embodiments of the present disclosure.

FIG. 2 illustrates a block diagram of an exemplary scheme for verifying flight suitability. The scheme includes a flight suitability verification circuit 251 of a server 205, a flight suitability management circuit 231 of a ground station 202, a user warning and indication circuit 234 of the ground station 202, a flight suitability management circuit 241 of a remote controller 204, and a flight suitability management circuit 211, a flight controller 215, a status indicator light 216, a sensor 213 such as a global position system (GPS), and an identity management circuit 214 of a UAV 201, to realize an online verification of the UAV system.

The sensor 213 for providing time and/or position information in FIG. 2 may include a receiving sensor of a satellite positioning and navigation system. The satellite positioning and navigation system may include at least one of a GPS, Beidou (i.e., the Beidou navigation satellite system), or Galileo (i.e., the Galileo satellite navigation system). The sensor 213 may further include a mobile phone communication network receiving sensor, such as a subscriber identification module (SIM) card; or an Internet receiving sensor such as a wireless network card; and/or a public Wi-Fi receiving sensor. Other methods can also be used to obtain needed time and/or position information. For example, a timer using an independent power supply device may be arranged in a UAV or a ground station to provide time information for a periodicity restriction, and time information, position information and/or the like provided in a communication network of a mobile phone and/or Internet may be obtained. The status indicator light can be replaced by sound and/or by a manner that a sound and an indicator light are fused. The ground station can include a stand-alone visualization ground station, such as a smart phone, a tablet computer, or the like, and/or a manual control apparatus, such as a remote controller, and/or an integrated control station of a visualization ground station and a manual control apparatus.

Verification contents may include at least one of: a UAV system firmware version suitability; a suitability of long-term and/or temporary flight restriction database in a ground station and/or a UAV; a suitability of database associated with safe operations in a ground station and/or a UAV; a suitability of UAV configuration; a suitability of UAV model; and/or whether the UAV system or personnel is on a black list or a list of restricted managers.

For the above-described verification items, e.g., verification contents, a preset time interval may be defined as a time interval at which the online verification needs to be performed for all items. In some other embodiments, one time interval may be defined for each item individually or a plurality of items as the time interval for online verification. In some embodiments, the UAV and the ground station may perform online verification separately. If the UAV includes a network communication receiving circuit, such as a wireless network circuit, a Wi-Fi circuit, a SIM card, and/or other mobile network circuit, a separate online verification can also be achieved. Thus, online verification time of the UAV and the ground station may be different from each other. For a plurality of UAV systems, UAVs and grounds station may not be one-on-one match for flights. In order to ensure the safety of UAV operation, online verification before a flight may be realized through the flight suitability management circuit 211 of the UAV 201.

For the safe operation of UAV, the UAV and the ground station that includes the manual control apparatus and the visualization ground station may perform different roles and functions on ensuring the safe operation of the UAV, according to different designs. Thus, when performing online verifications, the online verification items of the ground station and the UAV may be different. But for an entire UAV system, the online verification items may have close relations.

Figure 3:
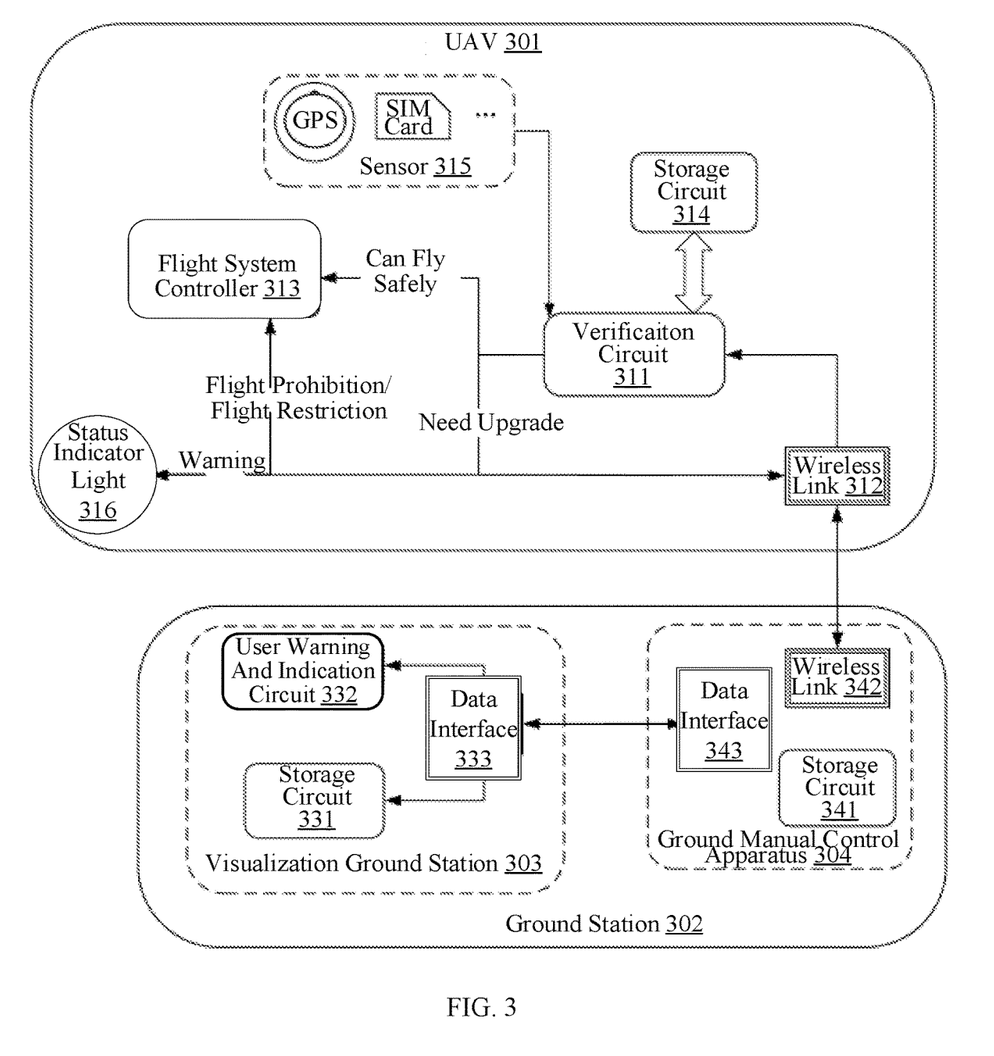
FIG. 3 illustrates another schematic view of verifying flight suitability consistent with various disclosed embodiments of the present disclosure.

As shown in FIG. 3, when the latest online verification time of the UAV and the ground station is same, the UAV system can perform the flight suitability verification according to verification rules fixedly matched by the UAV system supplier.

A storage circuit 314 of a UAV 301 may include a record of the latest online verification of the UAV, UAV upgrade and version records, and/or a UAV maintenance record. The storage circuit 314 may further include a latest online verification record of the ground station, ground station upgrade and version records, and/or a ground station maintenance record. The storage circuit 314 may further include a long-term or temporary flight restriction database, other databases associated with safe operations, such as navigation databases. The storage circuit 314 may further include UAV system and personnel identification information for verifying whether the UAV system or operator is in a blacklist or restriction list.

A storage circuit 331 of a visualization ground station 303 may include: a latest online verification record of the visualization ground station 303, and/or latest upgrade and version records of the visualization ground station 303. The storage circuit 331 may further include a long-term or temporary flight restriction database, and/or other databases associated with safe operations, such as navigation databases. The storage circuit 331 may further include upgrade and verification records of long-term or temporary flight restriction database and/or other upgrade and verification records of databases associated with safe operations.

A storage circuit 341 of a ground manual control apparatus 304 may include a latest online verification record of the ground manual control apparatus 304, and/or latest upgrade and version records of the ground manual control apparatus 304. The storage circuit 341 may further include some or all of data stored in the storage circuit 331 of the visualization ground station 303. In some embodiments, the ground manual control apparatus 304 may include a remote controller.

A verification circuit 311 of the UAV 301 may obtain real-time time information (and real-time position information in certain scenarios) through a sensor 315; may obtain, from a storage circuit of the system, at least one of the latest verification time of the UAV, a UAV firmware version, latest verification time of the ground station, a firmware version of the ground station, model suitability information, configuration suitability information, a long-term or temporary flight restriction database version, other safe-operation associated database version, or whether the UAV system or operator is in a blacklist or in a restriction list. The verification circuit 311 may obtain other information stored in the storage circuit of the system. The storage circuit of the system may include at least one of the storage circuit 314 of the UAV 301, the storage unit 331 of the visualization ground station 303, or the storage circuit 341 of the ground manual control apparatus 304. The verification circuit 311 may perform flight suitability verification on the verification items obtained from the storage unit of the system according to the obtained real-time time information (and real-time position information in certain scenarios) and a preset verification rule of the system. In response to a verification result indicating that the UAV system is at an airworthy status, information indicating that the flight is safe may be sent to a flight controller. In the present disclosure, information contents are not restricted. In response to a verification result indicating that at least one verification item of the UAV system needs an upgrade, flight prohibition and/or flight restriction information may be sent to the flight controller. Further, warning information may be sent to a status indicator light. Further, information indicating a need for upgrade may be sent to the ground station 302 through a wireless link.

In some embodiments, the UAV may further include a latest online verification record circuit configured to obtain a verification item from the storage circuit of the system, and send the verification item to the verification circuit 311.

In the scenarios that latest online verification time of the UAV and the ground station is different, it may be needed to determine a redundancy or replacement relationship between verification items of the UAV and the ground station, according to the verification items of the UAV and the ground station that need verification, and to compare and analyze versions, verification time, and/or upgrade time of redundancy or replacement items to determine a relatively new item, and to perform flight suitability verification according to a preset verification rule of the system. In some embodiments, a latest verification rule used in scenarios that the UAV and the ground station have consistent online verification time may be adopted.

In some embodiments, the verification item may include at least one of the items shown in Table 1.

TABLE 1

Verification items

| Verification item | Parameter |
|---|---|
| UAV firmware | Current Suitable Version |
| | Longest Acceptable Verification Time Interval |
| Firmware of Manual Control Apparatus | Current Suitable Version |
| | Longest Acceptable Verification Time Interval |
| Firmware of Visualization Ground Station | Current Suitable Version |
| | Longest Acceptable Verification Time Interval |
| UAV Model | Suitable or Not |
| | Longest Acceptable Verification Time Interval |
| Flight Restriction Database | Current Suitable Version |
| | Update Time of Long-term and/or Temporary Flight Restriction Data for Flight Region |
| | Longest Acceptable Verification Time Interval |
| Other Database associated with Safety | Current Suitable Version |
| | Longest Acceptable Verification Time Interval |
| Flight Restriction Database in A Ground Station | Current Suitable Version |
| | Update Time of Temporary Flight Restriction Data for Flight Region |
| | Longest Acceptable Verification Time Interval |
| Operator | In A Blacklist or Not |
| | Longest Acceptable Verification Time Interval |
| UAV and/or Each Identity Circuit Thereof | In A Blacklist or Not |
| | Longest Acceptable Verification Time Interval |
| UAV Configuration | UAV Operation Type Configuration Setting |
| | Longest Acceptable Verification Time Interval |
| UAV System Hardware Circuit | Each Hardware Circuit Suitable or Not |
| | Longest Acceptable Verification Time Interval |

In some embodiments, an online verification may be performed in response to a UAV, a manual control apparatus, a ground station, and/or another component/device being used for a first time.

In some embodiments, for the UAV verification items and parameters, a configurable method may be provided to a manager or a user, and the manager or the user may add, delete, and change verifiable items and parameters as needed.

In some embodiments, configuring corresponding verifiable items and parameters according to a model, an operation type, an operation approval status, an aircraft, and/or a user may be supported.

In some embodiments, a multi-level management and a multi-management authority level management process may be supported.

In some embodiments, for the verification result of the UAV system, the flight operator may be notified of whether a current status of the UAV system is suitable for a flight, through a status indicator light, a sound/voice prompt, a tactile design prompt, a user warning and indication circuit in the visualization ground station, and/or the like. In response to the online verification confirming that a UAV firmware, a ground station firmware, long-term or temporary flight restriction databases, other safety associated data setting, a configuration, a model, certain UAV, an operator, and/or the like are not suitable for a current flight, a flight operator may be notified through a status indicator light, a sound/voice, a visualization warning information prompt, and/or the like, and the flight of the UAV may be restricted or even prohibited. In some embodiments, regarding a post-verification handling method, a configurable method may be provided, and the manager and/or the user may automatically or manually configure and select corresponding restriction and handling measures according to actual needs. Restriction and treatment measures can include at least one of: a flight restriction; a flight prohibition; a warning; a mandatory online verification; mandatory upgrade of firmware, database, and/or hardware; operator restriction or operator type restriction; mandatory return to factory or maintenance; or others. The flight restriction may include a height restriction and/or a range restriction, additional flight restriction of certain areas, a speed restriction, a flight time restriction and/or a flight trip number restriction that supports display of remaining flight time or remaining flight trip number in the visualization ground station, a control mode restriction, a configuration setting restriction, and/or other restriction.

In some embodiments, if a manufacturer or a UAV regulation agency confirms that one or more models fail to ensure a safe flight by means of an upgrade, the manufacturer or the UAV regulation agency may prohibit or restrict flights of UAV corresponding to such models, or request hardware upgrades being performed or repair being performed by return to the factory or at a designated repair site. If it is confirmed that the current safety requirements are satisfied after the repair, the aircraft model, e.g., the UAV model, may be changed to an upgraded model number, or changed to an operational status or a status that a flight is permitted. Accordingly, usability of UAV that satisfies safety requirements may be ensured.

Figure 4:
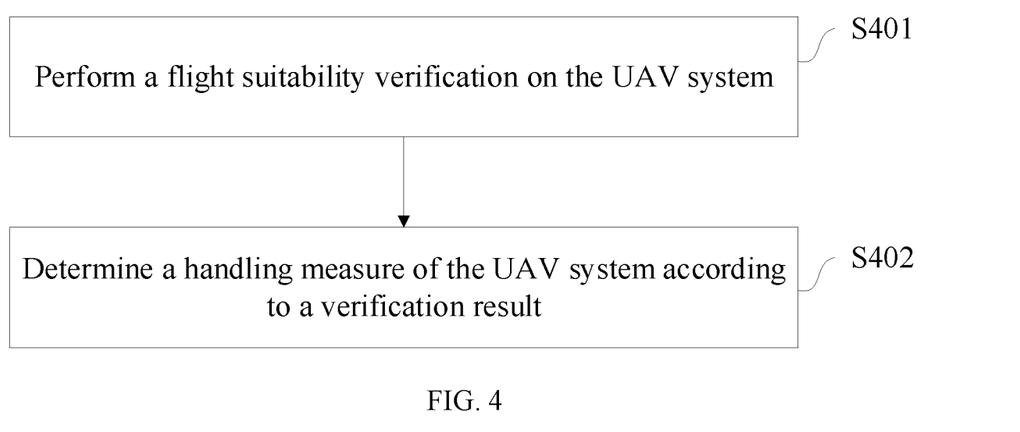
FIG. 4 is a flow chart of an exemplary flight suitability verification method consistent with various disclosed embodiments of the present disclosure.

FIG. 4 is a flow chart of an exemplary online verification method consistent with various disclosed embodiments of the present disclosure. With reference to FIG. 4, the method is described below.

At S401, a flight suitability verification on the UAV system is performed.

In some embodiments, verification items that perform the flight suitability verification on the UAV system may include at least one of performing a flight suitability verification on a setting of the UAV system or performing a flight suitability verification on a setting of data associated with safe operations.

In some embodiments, the UAV system firmware version may include at least one of a UAV firmware version, a ground station firmware version, a remote controller firmware version, or an operation parameter setting.

In some embodiments, a setting of data associated with safe operations may include at least one of a long-term flight restriction database, a temporary flight restriction database, a navigation database, or a flight management database.

Further, the verification item(s) may further include at least one of a UAV configuration, a UAV model, whether the UAV system is in a blacklist, or whether the operator is in a blacklist.

In some embodiments, performing the flight suitability verification on the UAV system may include performing periodically the flight suitability verification on the UAV system.

In some embodiments, performing periodically the flight suitability verification on the UAV system may include obtaining real-time time information of the UAV system, comparing the obtained real-time time information with a latest verification time, and performing the flight suitability verification on the UAV system in response to a time interval between the real-time time information and the latest verification time being longer than a preset time interval.

In some embodiments, real-time time information of the UAV system may be obtained by using at least one of a satellite positioning and navigation system, a mobile phone communication base station, Wi-Fi, a public network, or a timer in the UAV system.

In some embodiments, the satellite positioning and navigation system may include at least one of a global position system (GPS), a Beidou navigation system, a global navigation satellite system (GLONASS), an Indian regional navigation system, or a Galileo navigation system.

In some embodiments, each verification item may correspond to one preset time interval, and in response to a time interval between the real-time time information and the latest verification time being longer than the preset time interval of the verification item, the verification item may be verified.

In some embodiments, N verification items may correspond to one preset time interval, and in response to a time interval between the real-time time information and the latest verification time being longer than the preset time interval of the N verification items, the N verification items may be verified, where N is an integer larger than or equal to 2.

In some embodiments, performing periodically the flight suitability verification of the UAV may include obtaining real-time time information and real-time position information of the UAV system; comparing the real-time time information with a latest verification time to obtain a time interval between the real-time time information and the latest verification time; determining a verification item that needs verification according to the time interval and the real-time position information; and performing the flight suitability verification on the determined verification item that needs verification.

At S402, a handling measure of the UAV system is determined according to a verification result.

In some embodiments, according to the verification result, at least one measure can be taken on the UAV system. The measure may include at least one of a flight restriction, a flight prohibition, a warning, a mandatory firmware upgrade, a mandatory database upgrade, a mandatory hardware upgrade, an operator restriction or a user type restriction, or a mandatory return to factory.

In some embodiments, the flight restriction may include at least one of a height restriction, a range restriction, an additional flight restriction in certain area, a speed restriction, a flight time restriction or a flight trip number restriction, a control mode restriction, or a configuration setting restriction.

In some embodiments, the flight time restriction or the flight trip number restriction, i.e., restricting flight time or flight trip number, may include displaying remaining flight time or remaining flight trip number in the visualization ground station.

In some embodiments, the online verification method may further include notifying a flight personnel of whether a current UAV system status is suitable for the flight according to the verification result, through at least one of a status indicator light, a sound, a voice, a touch, or a user warning and indication circuit in the visualization ground station.

In some embodiments, the online verification method may further include determining a redundancy verification item of the UAV and the ground station according to the items of the UAV and the ground station that need verification; comparing a latest verification time of redundancy verification item corresponding to the UAV with a latest verification time of redundancy verification item corresponding to the ground station to determine a latest verification result of the redundant verification item.

Figure 5:
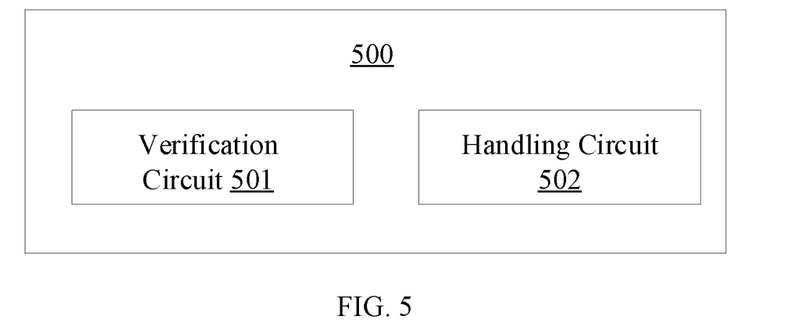
FIG. 5 is a block diagram of an exemplary apparatus for verifying flight suitability consistent with various disclosed embodiments of the present disclosure.

FIG. 5 is a block diagram of an exemplary online verification apparatus 500 consistent with various disclosed embodiments of the present disclosure. As shown in FIG. 5, the online verification apparatus 500 includes a verification circuit 510 and a handling circuit 502.

The verification circuit 501 is configured to perform a flight suitability verification on the UAV system, and verification item(s) include at least one of a UAV system setting or a setting of data associated with safe operations.

The handling circuit 502 is configured to determine a handling measure of the UAV system according to a verification result.

In some embodiments, a UAV system firmware version may include at least one of a UAV firmware version, a ground station firmware version, a remote controller firmware version, or an operating parameter setting.

In some embodiments, the a setting of data associated with safe operations may include at least one of a long-term flight restriction database, a temporary flight restriction database, a navigation database, or a flight management database.

Further, the verification item(s) may also include at least one of a UAV configuration, a UAV model, whether the UAV system is in a blacklist, or whether the operator is in a blacklist.

In some embodiments, the verification circuit may be further configured to perform periodically the flight suitability verification on the UAV system.

Figure 6:
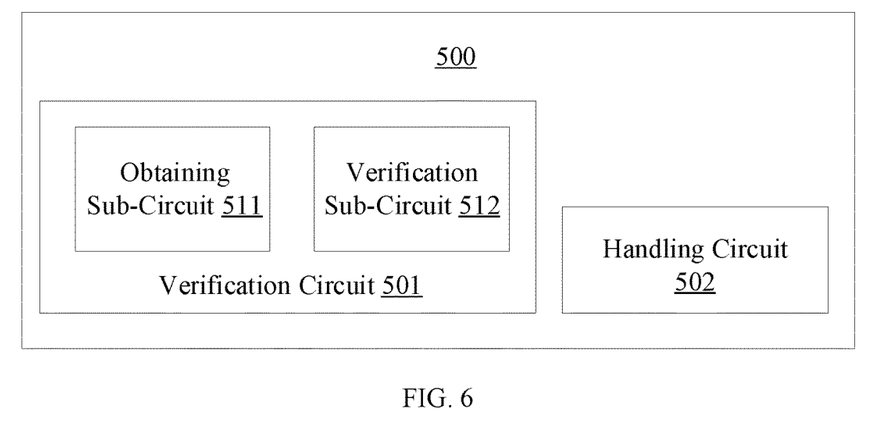
FIG. 6 is a block diagram of another exemplary apparatus for verifying flight suitability consistent with various disclosed embodiments of the present disclosure.

In some embodiments, as shown in FIG. 6, the verification circuit 501 includes an obtaining sub-circuit 511 and a verification sub-circuit 512.

In some embodiments, the obtaining sub-circuit 511 may be configured to obtain real-time time information of the UAV system. The verification sub-circuit 512 may be configured to compare the obtained real-time time information with a latest verification time; and to perform the flight suitability verification on the UAV system, in response to a time interval between the obtained real-time time information and the latest verification time being longer than a preset time interval.

In some embodiments, the obtaining sub-circuit 511 can obtain the real-time time information of the UAV system by using at least one of a satellite positioning and navigation system, a mobile phone communication base station, Wi-Fi, a public network, or a timer in the UAV system.

In some embodiments, the satellite positioning and navigation system may include at least one of a global position system (GPS), a Beidou navigation system, a global navigation satellite system (GLONASS), an Indian regional navigation system, or a Galileo navigation system.

In some embodiments, each verification item may correspond to one preset time interval, and in response to a time interval between the obtained real-time time information and the latest verification time of the verification item being longer than the preset time interval of the verification item, the verification item may be verified.

In some embodiments, N verification items may correspond to one preset time interval, and in response to a time interval between the obtained real-time time information and the latest verification time of the N verification items being longer than the preset time interval of the N verification items, the N verification items may be verified, where N is larger than or equal to 2.

In some embodiments, the obtaining sub-circuit 511 may be further configured to obtain real-time time information and real-time position information of the UAV system. The verification sub-circuit 512 may be configured to compare the obtained real-time time information with a latest verification time to obtain a time interval between the real-time time information and the latest verification time; to determine a verification item that needs verification according to the time interval and the real-time position information; and to perform the flight suitability verification on the verification item that needs verification.

In some embodiments, the handling circuit 502 may be configured to perform at least one measure on the UAV according to a verification result. The measure may include at least one of a flight restriction, a flight prohibition, a warning, a mandatory firmware upgrade, a mandatory database upgrade, a mandatory hardware upgrade, an operator restriction or a user type restriction, or a mandatory return to factory.

In some embodiments, the flight restriction may include at least one of a height restriction, a range restriction, an additional flight restriction in certain area, a speed restriction, a flight time restriction or a flight trip number restriction, a control mode restriction, or a configuration setting restriction.

In some embodiments, the flight time restriction or the flight trip number restriction, i.e., restricting flight time or flight trip number, may include displaying remaining flight time or remaining flight trip number in the visualization ground station.

Figure 7:
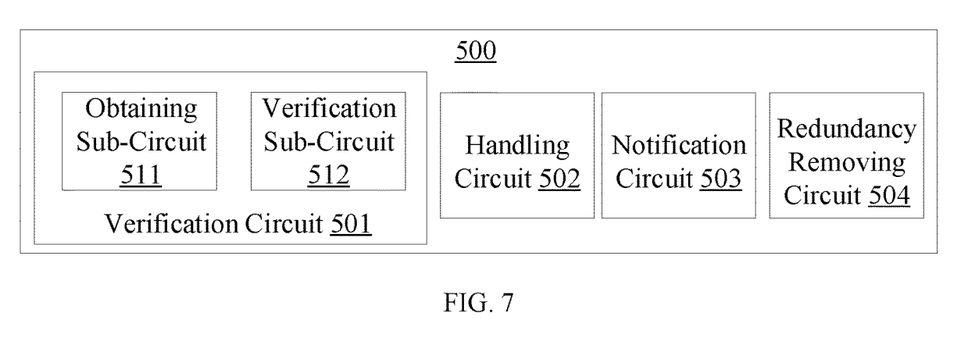
FIG. 7 is a block diagram of another exemplary apparatus for verifying flight suitability consistent with various disclosed embodiments of the present disclosure.

In some embodiments, as shown in FIG. 7, the online verification apparatus 500 further includes a notification circuit 503. The notification circuit 503 may be configured to inform a flight personnel of whether a current UAV system status is suitable for the flight according to the verification result, through at least one of a status indicator light, sound and/or voice prompt(s), a tactile design prompt, or a user warning and indication circuit in the visualization ground station.

In some embodiments, as shown in FIG. 7, the online verification apparatus 500 further includes a redundancy removing circuit 504. The redundancy removing circuit 504 may be configured to determine a redundancy verification item of the UAV and the ground station according to the items of the UAV and the ground station that need verification; to compare a latest verification time of redundancy verification item corresponding to the UAV with a latest verification time of redundancy verification item corresponding to the ground station to determine a latest verification result of the redundant verification item.

The present disclosure further provides a UAV system including a UAV, a ground station, and an online verification apparatus such as one of the above-described online verification apparatuses. The online verification apparatus may be deployed on a UAV, a ground station, or a third-party device.

In some embodiments, the third-party device may include a server.

The present disclosure also provides a storage medium for storing instructions thereon. The instructions are configured to execute processes of an online verification method consistent with the present disclosure, such as any one of the above-described online verification methods.

The present disclosure provides an online verification method and apparatus. The online verification method may include performing a flight suitability verification on a UAV system. Verification items may include at least one of performing a flight suitability verification on a UAV system setting or performing a flight suitability verification on a setting of data associated with safe operations; and determining a handling measure of the UAV system according to a verification result. Accordingly, a UAV online verification may be realized to ensure that the UAV is at an acceptable safety level.

Embodiments in this disclosure are described in a progressive manner, and descriptions are made with focuses on differences of the embodiments. For same or similar portions, reference can be made to each other among the embodiments. The apparatuses of the disclosure correspond to the methods of the disclosure. For apparatuses of the disclosure, reference can be made to relevant descriptions of the above-described method embodiments.

The foregoing describes online verification method and apparatus, a UAV system, and a storage medium consistent with the present disclosure.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a memory, a USB disk, a hard disk, a mobile hard disk, a read-only memory (ROM), an electrically programmable ROM, an electrically erasable programmable ROM, a register, a random access memory (RAM), a magnetic disk, an optical disk, a CD-ROM, or a storage medium in any other form. A system consistent with the disclosure can include a processor and a non-transitory computer-readable storage medium storing instructions that, when executed, cause the processor to perform a method consistent with the disclosure, such as one of the above-described example methods.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An online verification method comprising:
capturing, via a sensor, at least one of real-time time information or real-time position information;
performing, by a processor, a flight suitability verification, based on a latest verification time obtained from at least one of a memory of an unmanned aerial vehicle (UAV), a memory of a ground station, or a server and based on the at least one of the real-time time information or the real-time position information, on a UAV system including the UAV and the ground station, the flight suitability verification being performed on at least one of a plurality of verification items, and the verification items including a setting of the UAV system and a setting of data associated with safe operations; and
determining, by the processor, a handling measure of the UAV system according to a verification result and controlling the UAV system to follow the handling measure to satisfy safety requirements and obtain safe operations of the UAV.

2. The method of claim 1, wherein the setting of the UAV system includes at least one of a UAV firmware version, a ground station firmware version, a remote controller firmware version, or a UAV operation parameter setting.

3. The method of claim 1, wherein the setting of the data associated with safe operations includes setting of at least one of a long-term flight restriction database, a temporary flight restriction database, a navigation database, or a flight management database.

4. The method of claim 1, wherein the at least one of the verification items further includes at least one of a UAV configuration, a UAV model, whether the UAV system is in a system blacklist, or whether a UAV operator is in an operator blacklist.

5. The method of claim 1, wherein performing the flight suitability verification includes performing a periodic flight suitability verification on the UAV system.

6. The method of claim 5, wherein performing the periodic flight suitability verification includes:
obtaining the real-time time information of the UAV system;
comparing the real-time time information with the latest verification time; and
performing the flight suitability verification on the UAV system in response to a difference between the real-time time information and the latest verification time being longer than a preset time interval.

7. The method of claim 6, wherein performing the flight suitability verification on the UAV system in response to the difference between the real-time time information and the latest verification time being longer than the preset time interval includes:
allocating a first preset time interval for one of the verification items, and performing the flight suitability verification on the one of the verification items in response to a difference between the real-time time information and a latest verification time of the one of the verification items being longer than the first preset time interval; or
allocating a second preset time interval for two or more of the verification items, and performing the flight suitability verification on the two or more of the verification items in response to a difference between the real-time time information and a latest verification time of the two or more of the verification items being longer than the second preset time interval.

8. The method of claim 5, wherein performing the periodic flight suitability verification includes:
obtaining the real-time time information and the real-time position information of the UAV system;
obtaining a time interval between the real-time time information and the latest verification time;
determining a verification-needed item from the verification items based on the time interval and the real-time position information; and
performing the flight suitability verification on the verification-needed item.

9. The method of claim 1, wherein:
determining the handling measure of the UAV system according to the verification result includes performing at least one of a flight restriction, a flight prohibition, a warning, a mandatory firmware upgrade, a mandatory database upgrade, a mandatory hardware upgrade, an operator restriction, a user type restriction, or a mandatory return to factory to the UAV system; and
the flight restriction includes at least one of a height restriction, a range restriction, an additional flight restriction in certain area, a speed restriction, a flight time restriction or a flight trip number restriction, a control mode restriction, or a configuration setting restriction.

10. The method of claim 1, further comprising:
notifying, according to the verification result, an operator of whether a current UAV system status is suitable for flight through at least one of a status indicator light, a sound, a voice, a touch, or a user warning and indication circuit in the ground station.

11. An online verification system comprising:
a processor; and
a memory storing instructions that, when executed by the processor, cause the processor to:
perform a flight suitability verification, based on a latest verification time obtained from a least one of a memory of an unmanned aerial vehicle (UAV), a memory of a ground station, or a server and based on at least one of real-time time information or real-time position information, on a UAV system including the UAV and the ground station, the at least one of the real-time time information or the real-time position information being captured via a sensor, the flight suitability verification being performed on at least one of a plurality of verification items, and the verification items including a setting of the UAV system and a setting of data associated with safe operations; and determine a handling measure of the UAV system according to a verification result and cause the UAV system to follow the handling measure to satisfy safety requirements and obtain safe operations of the UAV.

12. The system of claim 11, wherein the setting of the UAV system includes at least one of a UAV firmware version, a ground station firmware version, a remote controller firmware version, or a UAV operation parameter setting.

13. The system of claim 11, wherein the setting of the data associated with safe operations includes setting of at least one of a long-term flight restriction database, a temporary flight restriction database, a navigation database, or a flight management database.

14. The system of claim 11, wherein the at least one of the verification items further includes at least one of a UAV configuration, a UAV model, whether the UAV system is in a system blacklist, or whether a UAV operator is in an operator blacklist.

15. The system of claim 11, wherein the instructions further cause the processor to perform a periodic flight suitability verification on the UAV system.

16. The system of claim 15, wherein the instructions further cause the processor to:
obtain the real-time time information of the UAV system;
compare the real-time time information with the latest verification time; and
perform the flight suitability verification on the UAV system in response to a difference between the real-time time information and the latest verification time being longer than a preset time interval.

17. The system of claim 16, wherein the instructions further cause the processor to:
allocate a first preset time interval for one of the verification items, and perform the flight suitability verification on the one of the verification items in response to a difference between the real-time time information and a latest verification time of the one of the verification items being longer than the first preset time interval; or
allocate a second preset time interval for two or more of the verification items, and perform the flight suitability verification on the two or more of the verification items in response to a difference between the real-time time information and a latest verification time of the two or more of the verification items being longer than the second preset time interval.

18. The system of claim 15, wherein the instructions further cause the processor to:
obtain the real-time time information and the real-time position information of the UAV system;
obtain a time interval between the real-time time information and the latest verification time;
determine a verification-needed item from the verification items based on the time interval and the real-time position information; and
performing the flight suitability verification on the verification-needed item.

19. The system of claim 11, wherein:
the instructions further cause the processor to:
perform at least one of a flight restriction, a flight prohibition, a warning, a mandatory firmware upgrade, a mandatory database upgrade, a mandatory hardware upgrade, an operator restriction, a user type restriction, or a mandatory return to factory to the UAV system; and
the flight restriction includes at least one of a height restriction, a range restriction, an additional flight restriction in certain area, a speed restriction, a flight time restriction or a flight trip number restriction, a control mode restriction, or a configuration setting restriction.

20. The system of claim 11, wherein the instructions further cause the processor to:
notify, according to the verification result, an operator of whether a current UAV system status is suitable for flight through at least one of a status indicator light, a sound, a voice, a touch, or a user warning and indication circuit in the ground station.

21. An unmanned aerial vehicle (UAV) system comprising:
a UAV;
a ground station; and
an online verification system arranged at the UAV, the ground station, or a server, the online verification system including:
a processor; and
a memory storing instructions that, when executed by the processor, cause the processor to:
perform a flight suitability verification, based on a latest verification time obtained from at least one of a memory of the UAV, a memory of the ground station, or the server and based on at least one of real-time time information or real-time position information, on the UAV system, the at least one of the real-time information or the real-time position information being captured via a sensor, the flight suitability verification being performed on at least one of a plurality of verification items, and the verification items including a setting of the UAV system and a setting of data associated with safe operations; and
determine a handling measure of the UAV system according to a verification result and cause the UAV system to follow the handling measure to satisfy safety requirements and obtain safe operations of the UAV.

* * * * *